United States Patent [19]

Taylor

[11] Patent Number: 4,626,391
[45] Date of Patent: Dec. 2, 1986

[54] METHOD OF FINISHING A BODY PANEL JOINT

[75] Inventor: Edward F. Taylor, Farmington Hills, Mich.

[73] Assignee: General Motors Corporation, Detroit, Mich.

[21] Appl. No.: 685,386

[22] Filed: Dec. 24, 1984

[51] Int. Cl.⁴ .................. B29C 33/40; B29C 67/20
[52] U.S. Cl. ........................... 264/46.6; 264/46.7; 264/263; 264/313; 264/337
[58] Field of Search .............. 264/46.4, 46.5, 252, 264/259, 261, 46.6, 46.7, 263, 313, 316, 337

[56] References Cited

U.S. PATENT DOCUMENTS

| | | | |
|---|---|---|---|
| 4,128,934 | 12/1978 | Doring | 264/46.5 |
| 4,157,369 | 6/1979 | Doyle | 264/261 |
| 4,446,192 | 5/1984 | Dehlén | 264/261 |

FOREIGN PATENT DOCUMENTS 1080271 8/1967 United Kingdom .

*Primary Examiner*—Donald Czaja
*Assistant Examiner*—Leo B. Tentoni
*Attorney, Agent, or Firm*—Randy W. Tung

[57] ABSTRACT

A body panel joint finishing method to produce a finished body panel joint by molding a bead directly to a vehicle body in a single operation without any need for secondary processing to remove excess materials. The method utilizes a foamable plastic as the bead forming material to provide greatly improved sealing property for moisture prevention in the gaps of the sheet metal body panel joints.

2 Claims, 5 Drawing Figures

METHOD OF FINISHING A BODY PANEL JOINT

FIELD OF THE INVENTION

The present invention generally relates to a method of finishing body panel joints in a vehicle and, more particularly, it is concerned with a method of finishing a body panel joint by molding a plastic bead directly to the vehicle body in a single operation without any need of secondary processing to finish off the molding.

BACKGROUND OF THE INVENTION

Automotive sheet metal body panels are generally joined together by welding their overlapped depression edges in a lap weld process. A typical lap welded joint can be found at the roof panel/quarter panel joint and at the roof panel/window pillar panel joint. To improve the aesthetics and to prevent moisture penetration into the resulting trough-like joints, the joints are filled with a plastisol or a lead-based solder. In certain other applications, studs are welded to the joint first and then moldings are installed onto the stud to decorate the joint.

When the plastisol coating method is used, a body panel joint of poor aesthetic quality is obtained since there is no bead or molding to hide the trough-like joint. Furthermore, the plastisol coating frequently does not provide adequate protection to moisture penetration at locations where the gap between panels at the lap joint is larger than the allowed tolerances. Moisture penetration through the welded joint leads to rust problems in the sheet metal body.

In applications where metal or plastic moldings are installed over welded studs after the gap is first coated with plastisol, the aesthetic quality of the joint is improved but at greatly added manufacturing cost. Moreover, no improvement in the moisture penetration protection is made by the addition of the molding.

In other applications where lead-based solder is used, the trough-like joints are first over-filled with the solder material. The excess solder must then be skived off the joint area before it solidifies and the joint must then be sanded to form a smooth feather edge with the adjacent sheet metal panels before painting. This proves to be a very labor intensive process and the resulting quality of the finished joint is very operator-dependent.

It is therefore an object of this invention to provide a body panel joint finishing method capable of producing finished body panel joints having exceptional aesthetic and moisture prevention properties.

It is a more particular object of this invention to provide a method of obtaining a finished body panel joint molded directly to the vehicle body without any need for secondary processing to remove excess materials.

It is a further object of this invention to provide a method of finishing body panel joints by molding directly to the vehicle body a foamable material which provides greatly improved sealing property for moisture prevention in the gaps of the sheet metal lap joints.

BRIEF SUMMARY OF THE INVENTION

The present invention provides a method of finishing body panel joints having exceptional aesthetic and moisture prevention properties. A plastic material is injection molded directly into a trough-like body panel joint resulting in a bead having a finished exterior surface. No secondary processing is required to remove any excess materials from the finished bead by skiving or by sanding. A suitable material is a foamable plastic which under its injection pressure and its foaming pressure flows and expands in the trough-like joint to completely fill the gap between the body panels at the lap joint. Consequently, a foamable plastic provides greatly improved sealing property for moisture prevention in a body panel lap joint.

My novel technique provides a finished body panel joint in one operation in which a plastic material is injected directly into a trough-like joint forming a bead with a finished surface. Two major benefits are obtained with this novel technique. First, there is no excess material to be removed from the bead after molding thus providing a very economical and labor-saving process. Secondly, the foamable feature of the plastic material contributes to greatly improved sealing property in the lap welded joint preventing moisture penetration and potential rust problems.

My bead-molding technique is particularly applicable in sheet metal panels joined together by the lap-weld process. In a lap welded joint, the edges of two sheet metal panels are bent into right angle flanges and spot welded together forming a trough in the joint. This trough-like joint provides an ideal space to be filled in by a plastic bead injected by my bead molding technique.

In accordance with a preferred practice of my invention, a method of injection molding a foamable plastic material directly to a body panel joint providing a bead having a finished surface can be practiced by the following operative steps:

A mold is first made to the contour of the body panels of the area of the joint. The length of the mold is made adequate to cover the full length of the joint. The mold contains a feed hole and an interior mold surface having the same contour and the same surface finish of the plastic bead to be formed. It is preferably made of a pliable rubber material to enable a tight seal between surfaces of the mold and of the vehicle body when such mold is pressed against the vehicle body. After the mold is mounted on the vehicle body overlaying the body panel joint, a bead-forming material, preferably a foamable plastic like polyurethane, is injected through the feed-hole into the mold cavity formed by the interior mold surface and the surface of the trough-like joint. A short period of time is allowed for the bead-forming material to cure in the mold and to adhere securely to the vehicle body. The mold is then removed from the vehicle body.

A molded plastic bead having a finished surface is now securely attached to the vehicle body in the trough-like body panel joint. No secondary processing to remove any excess material from the bead is necessary. The sealing property of the plastic bead against moisture penetration into the body panel joint is far superior to other conventionally used methods such as plastisol coatings.

DESCRIPTION OF THE DRAWINGS

Other objects, features and advantages of the present invention will become apparent upon consideration of the specification and the appended drawings in which.

DESCRIPTION OF THE PREFERRED EMBODIMENT

My novel invention is a method of finishing a body panel joint in a single operation by injection molding a plastic bead directly into a trough-like joint. I have discovered that by using a foamable plastic as the bead-forming material, the sealing property of the joint against moisture penetration is greatly improved. My technique eliminates all the laborious secondary processing required in conventional soldering processes where excess materials must be removed and a smooth finished surface must be prepared by sanding for painting. In other words, a finished body panel joint can be completed in less than a minute when a fast curing foamable plastic material is used as the bead-forming material. This process is applicable either on the automobile assembly line or off the assembly line. It can be used either before a vehicle body is painted or after it is painted. In the case where a bead is molded in the body panel joint before the vehicle is painted, a high temperature resistant bead-forming material having a paintable surface can be readily painted with the rest of the vehicle and baked through the paint-baking cycle. When a bead is molded on a vehicle that has already been painted, a color-matched bead-forming material may be used. Alternatively, a black colored bead may be used which blends in with many automotive colors.

Figure 1:
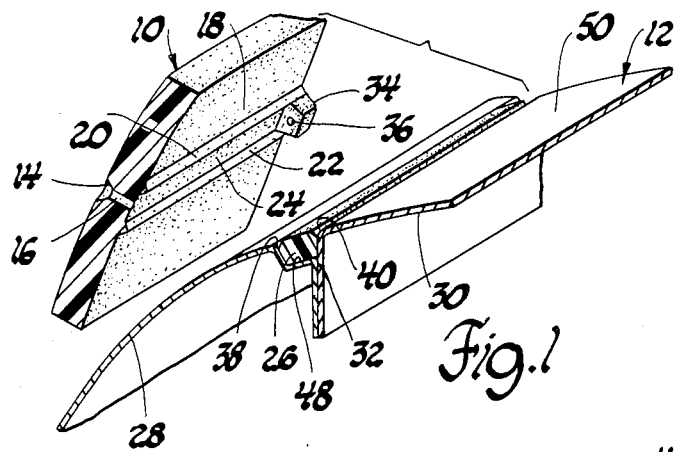
FIG. 1 is a perspective view showing a section of the mold being removed from the vehicle body after a plastic bead is molded in the trough-like joint.

Referring initially to FIG. 1, it is shown that a mold 10 is being removed from a vehicle body 12. In mold 10, a feed opening 14 is formed at the entrance of the feed hole 16 to facilitate the injection of bead-forming materials. The interior mold surface 18 contains ridges 20 and 22 to sealingly engage the shoulder portions 38 and 40 in the trough and cavity defining surface 24 to form the bead 26. Sheet metal panels 28 and 30 are lap welded together at 32. Two end blocks 34 are built into mold 10 at each end to form the end portions of the bead 26. A small vent hole 36 is drilled into end block 34 to allow air to escape during the injection process of the bead-forming material.

I have found a suitable mold-making material is a casting grade silicone rubber compound. Silicone rubber molds are desirable because they are pliable and can be pressed tightly against the sheet metal body forming a seal at ridges 20 and 22 (FIG. 1) to prevent leakage of the bead-forming material into the interface between the mold and sheet metal body. Silicone rubber also has a desirable non-sticking property so that the mold can be easily released from the bead surface after the bead-forming material is cured in the cavity. A suitable silicone rubber to be used is RTV-21 made by G.E. Other elastomeric materials such as urethane and fluorosilicone may also be used to make the mold. An important factor to consider is that the mold should be easily separable from the bead after molding.

I have also discovered that a convenient technique of making the mold is first preparing a replica of the sheet metal surface containing the body panel joint. A bead having a desirable surface carved from clay material is then placed in the trough-like joint. A box section containing four walls is then built on this sheet metal replica surrounding the body panel joint to be filled. A silicone rubber compound is poured into this casting box to a suitable depth. After the silicone rubber mold is cured, it is removed from the casting box. A mold with an interior surface duplicating exactly that of the sheet metal body and the bead is now constructed. A feed hole can be drilled into the mold to provide access to the cavity section.

Figure 2:
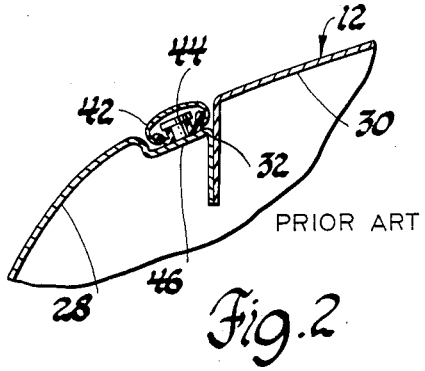
FIG. 2 is a cross-sectional view of a conventional molding installed on welded studs in a trough-like body panel joint.

FIG. 2 is a cross-sectional view of a prior art technique where a molding is installed over weld-studs. Mounting studs 44 are first welded to sheet metal panel 28 at 46. A conventional metal or plastic molding 42 is then fitted over the weld-stud 44. In this method a sealing material is additionally used to cover the joint 32 between sheet metal 30 and 28. This sealing material does not provide a perfect seal against moisture prevention, especially when the gap at 32 is larger than that allowed by the specification.

Figure 3:
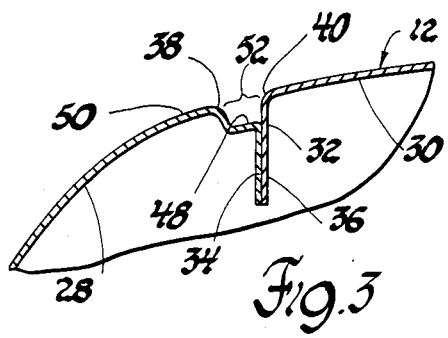
FIG. 3 is a sectional view showing sheet metal body panels welded together in a lap weld.

FIG. 3 shows a lap-weld construction where sheet metal panels 28 and 30 are bent at the edges forming right angle flanges 34 and 36, and then welded together at 32 making a trough-like joint. I have discovered that the best joint width 52 between sheet metal panels 28 and 30 is approximately 4 mm for the application of the present technique.

Figure 4:
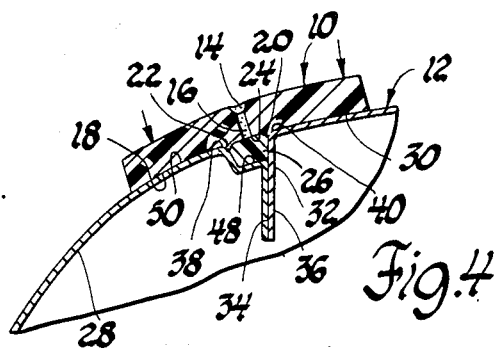
FIG. 4 is a sectional veiw showing a bead forming material being injected into a mold mounted on the vehicle body.

After mold 10 is tightly pressed against the sheet metal body 12, as shown in FIG. 4, a bead-forming material is injected into the cavity formed between the cavity surface 24 of mold 10 and surface 48 of the trough-like joint. A tight seal between ridges 20 and 22 of mold 10 and the shoulder sections 38 and 40 of the trough is formed to prevent potential leakage of the bead-forming material. A paintable and room temperature curable urethane bead-forming material supplied by REN Plastics (grade # 6422) was used. This material was injected from a hand-operated injection gun at a pressure of approximately 100 psi. The urethane material is forced into the cavity under the injection pressure and foams immediately to fill the cavity. The expansion of the foaming material forces it into the gaps between panels 28 and 30, thus providing a greatly improved seal against moisture penetration. Any other plastic material that can be room temperature cured in a relatively short period of time may also be used for this process. For instance, a two-component urethane material having a cure time of less than one minute which can be injected at low pressure is ideal for this application.

Figure 5:
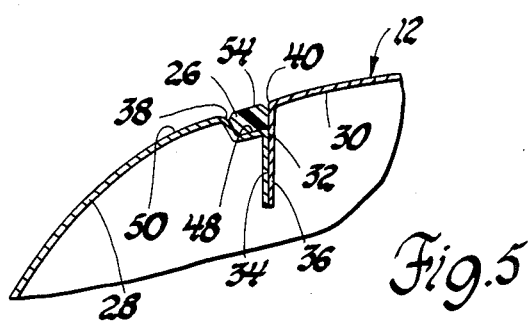
FIG. 5 is a sectional view showing a body panel joint containing a finished bead molded therein.

FIG. 5 shows a completed bead 26 permanently adhered to sheet metal body 12. The surface 54 of the bead 26 may be made smooth or textured by embossing the cavity surface 24 (FIG. 1). The color of the bead material may be made black to go with most paint colors. The bead may also be painted with the vehicle body in a paint cycle. In such applications, the bead material should be selected such that it is compatible with paint and that it is resistant to the paint bake temperatures.

It should be noted that even though a sheet metal body has been described here, this novel technique of bead-molding is applicable to body panels made of any materials. For instance, it is equally applicable to body panel joints of sheet molding compound or reaction injection molded plastic panels which are widely used in the automotive industry today. Similarly, this bead-molding technique may also be applied to bodies other than that of a vehicle.

While my invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A method of finishing joints in a body where two or more adjacent body panels are joined together forming a trough-like joint in between the panels by molding a plastic bead in said joint, said bead having a finished surface without any extraneous material to be removed while effecting an aesthetic quality and watertight seal, said method comprising the steps of:

pressing a mold against said body overlaying the joint, said mold comprising a feed hole and an interior cavity-defining surface having a contour of the bead surface to be formed, said mold being made of a pliable material effecting a tight seal between surfaces of the mold and of the body;

injecting a bead-forming material through said feed hole into a mold cavity defined by said interior cavity-defining surface and said trough-like joint surface;

curing said bead material in said mold until such time that the bead material has adhered to the body; and removing said mold from said body, whereby an aesthetic quality bead is formed in said trough-like joint between the panels achieving a watertight seal.

2. A method of finishing joints in an automobile body where two or more adjacent flanged body panels are joined together at the flanges in a joint that has a trough between said adjacent panels running the length of the joint, said method being characterized by molding a polyurethane bead in said trough so that said bead has a finished surface without any extraneous material to be removed while effecting an aesthetic quality and watertight seal, said method comprising the steps of:

pressing a mold overlaying the length of the joint against said vehicle body with sufficient force, said mold comprising two ridge portions spaced apart to sealingly engage the shoulder section of the trough, a feed hole, an interior cavity-defining surface having a contour of the bead surface to be formed, and two end blocks spaced apart sealing the ends of the mold at least one of said blocks having a small vent hole, said mold being made of a pliable silicone rubber material effecting a tight seal between surfaces of the mold and of the vehicle body;

injecting a bead-forming polyurethane material through said feed hole under sufficient pressure to completely fill the cavity defined by said interior cavity-defining surface and said end blocks in the mold and said trough surface in the vehicle body;

curing said urethane material in said mold until such time that the urethane material has adhered to the body; and removing said mold from said body, whereby an aesthetic quality bead is formed in said trough between the panels achieving a watertight seal.

* * * * *